(12) United States Patent
Onda et al.

(10) Patent No.: US 8,184,552 B2
(45) Date of Patent: May 22, 2012

(54) COMMUNICATION TERMINAL, CONTROL DEVICE, COMMUNICATION SYSTEM, AND PROGRAM

(75) Inventors: Yasushi Onda, Tokyo (JP); Izua Kano, Tokyo (JP); Dai Kamiya, Tokyo (JP); Yusuke Kushida, Tokyo (JP); Keiichi Murakami, Tokyo (JP); Eiju Yamada, Tokyo (JP); Kazuhiro Yamada, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 12/525,844

(22) PCT Filed: Feb. 7, 2008

(86) PCT No.: PCT/JP2008/052010
§ 371 (c)(1),
(2), (4) Date: Sep. 14, 2010

(87) PCT Pub. No.: WO2008/096809
PCT Pub. Date: Aug. 14, 2008

(65) Prior Publication Data
US 2010/0329183 A1    Dec. 30, 2010

(30) Foreign Application Priority Data

Feb. 8, 2007    (JP) .................................. 2007-029715

(51) Int. Cl.
*H04L 12/56* (2006.01)
*H04J 1/16* (2006.01)
(52) U.S. Cl. .................. 370/252; 370/278; 370/329
(58) Field of Classification Search .......... 370/252, 370/278, 329
See application file for complete search history.

(56) References Cited

U.S. PATENT DOCUMENTS

| 7,471,692 B1 * | 12/2008 | Erickson | 370/431 |
| 2005/0027870 A1 * | 2/2005 | Trebes, Jr. | 709/227 |

FOREIGN PATENT DOCUMENTS

| JP | 2000278761 A | 10/2000 |
| JP | 2003032386 A | 1/2003 |
| JP | 2003318765 A | 11/2003 |
| JP | 2005039795 | 2/2005 |
| JP | 2005102268 A | 4/2005 |
| JP | 2005244525 | 9/2005 |
| JP | 2006054841 | 2/2006 |
| JP | 2006060295 | 3/2006 |
| JP | 2006319969 A | 11/2006 |
| JP | 2007201909 A | 8/2007 |
| JP | 2007235492 A | 9/2007 |
| JP | 2008503109 A | 1/2008 |

* cited by examiner

*Primary Examiner* — John Pezzlo
(74) *Attorney, Agent, or Firm* — Michaud-Kinney Group LLP (57) ABSTRACT

A communication terminal providing optimal communication services between content providers comprising a property management table with an appraised value registered for each of a predetermined set of communication media properties for various types of communication media, a first user specified priority ranking list and a second priority ranking list specified by an application program provider with rankings for the set of communication media properties, whereby the desired communication medium is selected by adding weightings for priority from the first and second priority ranking lists and adding the appraised value for each item from the property management table and using the highest total to specify the optimum communication medium for use when commencement of communication is specified by a predetermined application program, and establishing communication connections between opposing devices using the selected optimum communication medium. Also disclosed are a communication system, control device and program including the communication terminal's elements.

8 Claims, 6 Drawing Sheets

| NW IDENTIFIER | SECURITY | FEE STRUCTURE | HANDOVER |
|---|---|---|---|
| 001 | 1 | 1 | 1 |
| 002 | 0 | 1 | 1 |
| 003 | 1 | 0 | 0 |

FIG. 2B

| NW IDENTIFIER | TIME ZONE 1 | TIME ZONE 2 | TIME ZONE 3 |
|---|---|---|---|
| 001 | 0.5 | 0.2 | 0.4 |
| 002 | 1.0 | 0.5 | 0.7 |
| 003 | 0.7 | 0.4 | 0.6 |

FIG. 2C

| NW IDENTIFIER | SECURITY | FEE STRUCTURE | HANDOVER | TIME ZONE 1 | TIME ZONE 2 | TIME ZONE 3 |
|---|---|---|---|---|---|---|
| 001 | 1 | 1 | 1 | 0.5 | 0.2 | 0.4 |
| 002 | 0 | 1 | 1 | 1.0 | 0.5 | 0.7 |
| 003 | 1 | 0 | 0 | 0.7 | 0.4 | 0.6 |

| ITEM | SECURITY | FEE STRUCTURE | HANDOVER | TRANSFER SPEED |
|---|---|---|---|---|
| PRIORITY RANKING | 0 | 0 | 0 | 1 |

FIG. 5D

| ITEM | SECURITY | FEE STRUCTURE | HANDOVER | TRANSFER SPEED |
|---|---|---|---|---|
| PRIORITY RANKING | 1 | 0 | 0 | 0 |

FIG. 5C

| ITEM | SECURITY | FEE STRUCTURE | HANDOVER | TRANSFER SPEED |
|---|---|---|---|---|
| PRIORITY RANKING | 1 | 3 | 4 | 2 |

FIG. 10

## COMMUNICATION TERMINAL, CONTROL DEVICE, COMMUNICATION SYSTEM, AND PROGRAM

TECHNICAL FIELD

The present invention relates to technology for establishing communication connections between content providers that provide predetermined communication services and communication terminals that utilize these communication services.

RELATED ART

With the advancement of data communication technology, multiple types of communication networks (communication media) with different properties have been realized, such as communication networks that place emphasis on data transfer speed and response speed (in other words, communication networks in which high-speed data communication is possible), communication networks that place emphasis on security, communication networks in which usage fees are charged according to transfer data volume, communication networks in which flat-rate usage fees are charged regardless of transfer data volume, and so on.

Furthermore, it has become possible for users requesting the utilization of various services offered by a content provider (hereinafter, "CP") to select a communication network that has properties corresponding to the user's preference (e.g., attaching importance to data transfer speed, attaching importance to cost performance, etc.) from among multiple types of communication networks and to utilize services offered by the CP (e.g., JP-A-2005-39795 and JP-A-2006-60295).

SUMMARY

Incidentally, there also exists a need whereby the CP side providing various services via a communication network may wish to specify a communication network used for the utilization of that service beforehand in response to the service content.

As stated above, according to an aspect of the technology disclosed in JP-A-2005-39795 and JP-A-2006-60295, it is possible to respond to needs on the user side, but it is not possible to respond to needs on the CP side regardless of whether the communication network that a user requests for utilization coincides with the communication network that the CP side requests.

The present invention has been devised in consideration of the above issues with the purpose of providing technology for establishing a communication connection via communication media selected with consideration of both the content provider demand and the user demand between a content server that provides a predetermined communication service and a communication terminal that utilizes the communication services thereof.

To resolve the above issues, according to an aspect of the invention, there is provided a communication terminal including: a property management table in which an appraised value of each of a plurality of types of communication media is registered for each of a plurality of predetermined items that shows communication media properties; a first priority ranking list in which a priority ranking assigned by users for each of the plurality of items is registered; a second priority ranking list in which a priority ranking assigned by a provider of the application program for each of the plurality of items is registered; selecting means for selecting one communication medium from among the plurality of types of communication media in response to the results of an addition, wherein in the event that a commencement of communication is specified according to a predetermined application program, for each of the plurality of types of communication media, a first weighting granted for an item in response to a priority ranking registered in the first priority ranking list and a second weighting granted for the item in response to a priority ranking registered in the second priority ranking list are added to an appraised value of the each item registered in the property management table; establishing means for establishing communication connections between opposing devices via communication media selected by the selecting means; and communicating means for communicating via the communication connection according to the application program.

By means of this communication terminal, a communication connection is established via communication media selected according to the property management table, the first priority ranking list, and the second priority ranking list.

In another aspect, this communication terminal may include acquiring means for acquiring the property management table from a predetermined control device.

By means of this communication terminal, a communication connection is established via communication media selected according to a property management table acquired from a control device.

In still another aspect, the plurality of items may include at least a communication speed. The communication terminal may further include: measuring means for measuring the communication speed when communication is performed according to the application program via a communication connection established by the establishing means; and transmitting means for transmitting, to the control device, data showing the communication speed measured by a measuring means as triggered by a completion of communication according to the application program by associating with an identifier that uniquely identifies communication media selected by the selecting means.

By means of this communication terminal, data indicating the communication speed is transmitted to the control device corresponding to an identifier that uniquely identifies selected communication media.

Furthermore, to resolve the above issues, according to another aspect of the present invention, there is provided control device, including: a property management table in which an appraised value of each of a plurality of types of communication media is registered for each of a predetermined plurality of items showing communication media properties; a first priority ranking list in which a priority ranking for each of the plurality of items assigned by communication terminal users is registered; a second priority ranking list in which a priority ranking for each of the plurality of items assigned by an application program provider is registered; selecting means for selecting, from among the plurality of types of communication media, communication media for which the communication should be mediated in response to the results of an addition, in which a first weighting granted for an item in response to a priority ranking registered in the first priority ranking list and a second weighting granted for the item in response to a priority ranking registered in the second priority ranking list are added to an appraised value of the each item registered in the property management table for each of the plurality of types of communication media in the event that the communication terminal communicates with an opposing device according to the application program; and notifying means for notifying the communication terminal of the results of a selection by the selecting means.

By means of this control device, communication media selected according to the property management table, the first priority ranking list, and the second priority ranking list are notified.

Furthermore, to resolve the above issues, according to yet another aspect of the present invention, there is provided a communication system including a control device by which a communication terminal communicates with a relevant communication terminal via the communication connection according to a predetermined application program, the communication terminal establishing a connection with an opposing device, wherein: the control device includes: a property management table in which an appraised value of each of a plurality of types of communication media is registered for each of a predetermined plurality of items showing communication media properties; and transmitting means for transmitting relevant property management table to the communication terminal in response to a request from the communication terminal, and the communication terminal includes: a first priority ranking list in which a priority ranking assigned by users for each of the plurality of items is registered; a second priority ranking list in which a priority ranking assigned by a provider of the application program for each of the plurality of items is registered; selecting means for selecting one from among the plurality of types of communication media in response to the results of an addition, in which a first weighting granted for an item in response to a priority ranking registered in the second priority ranking list and a second weighting granted for the item in response to a priority ranking registered in the second priority ranking list are added to an appraised value of the each item registered in the property management table for each of the plurality of types of communication media when a commencement of communication is specified by the application program; and establishing means for establishing a communication connection between the opposing devices via communication media selected by the selecting means.

By means of this communication system, a communication connection is established via communication media selected according to the property management table, the first priority ranking list, and the second priority ranking list.

Furthermore, to resolve the above issues, according to yet another aspect of the present invention, there is provided a communication system including a control device by which a communication terminal communicates with a relevant communication terminal via the communication connection according to a predetermined application program, the communication terminal establishing a connection with an opposing device, wherein: the control device includes a property management table in which an appraised value of each of a plurality of types of communication media is registered for each of a predetermined plurality of items showing communication media properties; the communication terminal includes a first priority ranking list in which a priority ranking assigned by communication terminal users for each of the plurality of items is registered; the communication terminal further includes a second priority ranking list in which a priority ranking assigned by a provider of the application program for each of the plurality of items is registered; the communication terminal further includes establishing means for establishing communication connections between the opposing devices via communication media that is notified by the control device as access point communication media while the first and second priority ranking lists are transmitted to the control device when a commencement of communication is specified according to the application program, the control device has selecting means for selecting, from among the plurality of types of communication media, communication media for which the communication should be mediated in response to the results of an addition, in which a first weighting granted in response to a priority ranking registered in a first priority ranking list received from the communication terminal and a second weighting granted in response to a priority ranking registered in a second priority ranking list received from the communication terminal are added to an appraised value of the each item registered in the property management table for each of the plurality of types of communication media when the communication terminal communicates with an opposing device according to the application program; and the control device has a notifying means for notifying the communication terminal of results of a selection by the selecting means.

By means of this communication system, communication media selected according to the property management table, the first priority ranking list, and the second priority ranking list are notified.

Furthermore, to resolve the above issues, according to yet another aspect of the present invention, there is provided a program causing a computer device to execute a process, the computer device including a property management table in which an appraised value is registered for each of a predetermined plurality of items showing communication media properties for each of a plurality of types of communication media, a first priority ranking list in which a priority ranking assigned by users for each of the plurality of items is registered, and a second priority ranking list in which a priority ranking assigned by a provider of the application program for each of the plurality of items is registered, the process including: selecting one from among the plurality of types of communication media in response to the results of an addition, in which a first weighting granted for an item in response to a priority ranking registered in the first priority ranking list and a second weighting granted for the item in response to a priority ranking registered in the second priority ranking list are added to an appraised value of the each item registered in the property management table for each of the plurality of types of communication media when a commencement of communication is specified according to a predetermined application program; establishing a communication connection between opposing devices via the selected communication media; and communicating via the communication connection according to the application program.

By means of this program, a communication connection is established via communication media selected according to the property management table, the first priority ranking list, and the second priority ranking list.

Furthermore, to resolve the above issues, according to yet another aspect of the present invention, there is provided a program causing a computer device to execute a process, the computer device including a property management table in which an appraised value of each of a plurality of types of communication media is registered for each of a predetermined plurality of items showing communication media properties, a first priority ranking list in which a priority ranking assigned by communication terminal users is registered for each of the plurality of items, and a second priority ranking list in which a priority ranking assigned by a provider of an application program for each of the plurality of items is registered, the process including: selecting, from among the plurality of types of communication media, communication media for which the communication should be mediated in response to the results of an addition, in which a first weighting granted for an item in response to a priority ranking registered in the first priority ranking list and a second weighting granted for the item in response to a priority ranking registered in the second priority ranking list are added to an appraised value of the each item registered in the property management table for each of the plurality of types of communication media when the communication terminal communicates with an opposing device according to the application program; and notifying the communication terminal of the results of a selection.

By means of this program, a communication connection via communication media selected according to the property management table, the first priority ranking list, and the second priority ranking list is notified.

BRIEF DESCRIPTION OF THE DRAWINGS

Exemplary embodiments of the present invention will be described in detail based on the following figures, wherein:

FIG. 6 is a flowchart showing the flow of an access point NW selection process executed by a CPU 110a;

DESCRIPTION OF REFERENCE SYMBOLS 10, 20—communication systems; 100, 700—communication terminals; 200, 200a, 200b, 200c—wireless communication networks; 210, 210a, 210b, 210c—base stations (BS); 300, 800—control devices; 400—gateway (GW); 500—communication network; 600—content server; 110—control part; 110a, 810—CPUs; 110b—ROM; 110c—RAM; 110d—EEPROM; 120—wireless communication part; 120a—first wireless communication IF unit; 120b—second wireless communication IF unit; 120c—third wireless communication IF unit; 820—communication IF unit; 130—operation unit; 140—display unit; 830—memory; 830a—volatile memory; 830b—non-volatile memory; 150, 840—buses

DETAILED DESCRIPTION

Below, exemplary embodiments for implementing the present invention will be explained while referring to the drawings.

A: First Exemplary Embodiment
A-1: Configuration

Figure 1:
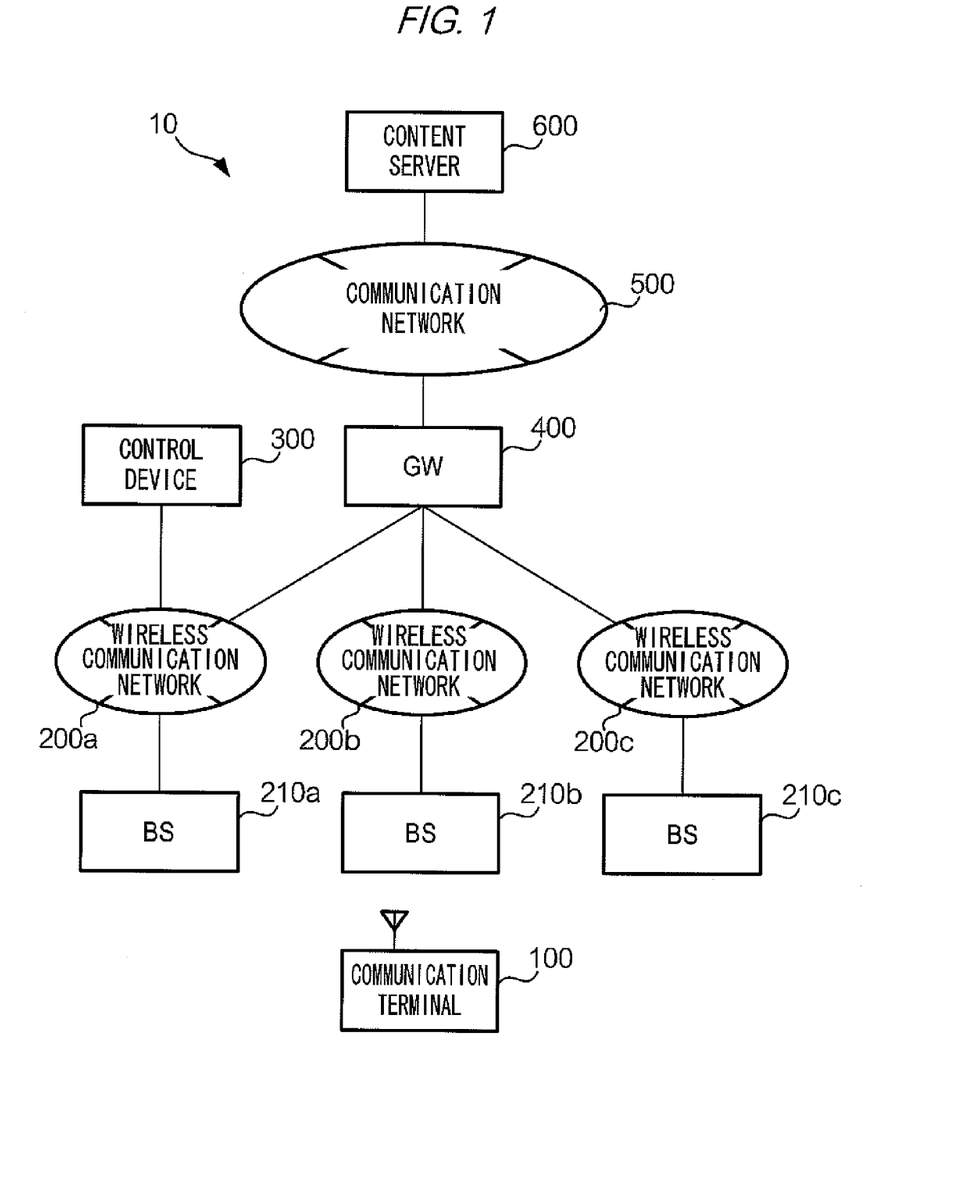
FIG. 1 shows an example of the configuration of a communication system 10 relative to the first exemplary embodiment of the present invention.

FIG. 1 shows an example configuration of a communication system 10 relative to an exemplary embodiment of the present invention.

As shown in FIG. 1, the communication system 10 includes: a communication terminal 100 constituting a mobile telephone provided, for example, with a program execution function; three possible types of wireless communication networks accommodating this communication terminal 100 (specifically, wireless communication networks 200a, 200b, and 200c); and a communication network 500 connected to wireless communication networks 200a, 200b, and 200c via a gateway (hereinafter represented as "GW") 400.

The wireless communication networks 200a, 200b, and 200c may be a communication network conforming, for example, to the PDC (Personal Digital Cellular) standard, GSM (Global System for Mobile Communications) standard, or IMT-2000 (International Mobile Telecommunication-2000), or may be a wireless LAN (Local Area Network) or the like as specified, for example, by "IEEE 802.11b", which is the specification for Ethernet (registered trademark). Further details are described below, but the three wireless communication networks above have different properties, such as the fee structure and the degree to which security is ensured. Note that FIG. 1 shows examples regarding a case in which the properties of the three different types of wireless communication networks are mutually included in a communication system 10, but the wireless communication networks included in the communication system 10 may consist of two types, and furthermore may consist of four or more types. The point is that the properties mutually differ, and moreover, that the multiple wireless communication networks in which it is possible to include a communication terminal 100 at least include a communication system 10.

In the communication network 500, such as the Internet, for example, a content server 600 providing information retrieval services or providing various digital content (e.g., melodic data) is connected. Note that a detailed description of the configuration of the content server 600 has been omitted, as it does not consist of any changes from the configuration (hardware configuration and software configuration) of a general content server. Furthermore, in the present exemplary embodiment, the communication network 500 will be described with regard to the case of the Internet, but of course it may also be a LAN.

The GW 400 mediates communication between the communication terminal 100 accommodated in any of the wireless communication networks 200a, 200b, or 200c and the content server 600 connected to the communication network 500, and is provided with a function of interconverting between the communication protocol of each wireless communication network above and the communication protocol of the communication network 500. Note that a detailed description of the GW 400 has been omitted, as there is no change from the configuration of a general gateway device. Furthermore, in FIG. 1, a case is described in which the wireless communication networks 200a, 200b, and 200c are connected to the communication network 500 via the GW 400, but of course each wireless communication network may be connected to the communication network 500 via a different gateway device.

The wireless communication networks 200a, 200b, and 200c accommodate a communication terminal 100 and provide wireless communication services, and include base stations (hereinafter represented as "BS") 210a, 210b, and 210c that establish wireless links with the communication terminal 100. Note that, below, in cases in which it is not necessary to distinguish among the three types of wireless communication networks above, such is represented as "wireless communication network 200". Similarly, in cases in which it is not necessary to distinguish among each of the three types of BS above, such is represented as "BS 210".

The BS 210 arranges each cell divided into multiple cells having a predetermined width (e.g., 500-meter radius) above ground, establishes wireless links between communication terminals within the range of the cells, and accommodates the communication terminals thereof. The BS 210 receives data that has been transmitted from a communication terminal that the station itself accommodates and sends the data to a wireless communication network 200 to which the station itself is connected. Furthermore, the BS 210 receives data that has been transmitted from the wireless communication network 200 to the communication terminal address and sends the data wirelessly within a cell that is subordinate to the station itself.

Note that, in the communication system 10 shown in FIG. 1, each of the wireless communication networks 200a, 200b, and 200c has a variety of inherent properties with respect to each item regarding the degree to which security is ensured (in the present exemplary embodiment, whether they are compatible with encrypted communication), the fee structure, and whether handover is possible between wireless communication networks.

Specifically, the wireless communication network 200a has a pay-as-you-go fee structure (usage based fee structure) in which a usage fee is charged according to the transferred data volume, and furthermore, is compatible with both encrypted communication and unencrypted communication. The wireless communication network 200b has a pay-as-you-go fee structure, and furthermore, is compatible only with unencrypted communication. Moreover, the wireless communication network 200c is a communication network having a flat-rate system fee structure in which a flat-rate usage fee is charged in predetermined period units such as January, for example, and is compatible with both encrypted communication and unencrypted communication. In addition, among the three types of wireless communication networks above, there are properties in which the wireless communication network 200a and the wireless communication network 200b are compatible with handover between wireless communication networks and the wireless communication network 200c is incompatible with handover with other wireless communication networks.

Figure 2A:
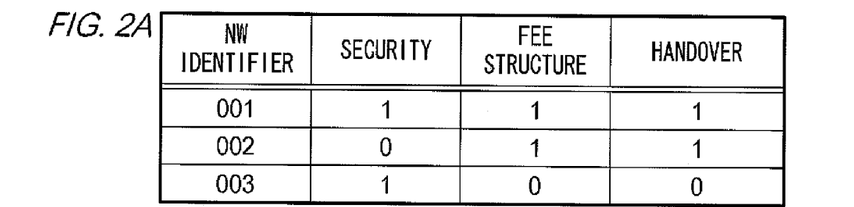
FIG. 2 shows an example of a property management table stored in a control device 300.

FIG. 2(A) shows an example of a property management table displaying each wireless communication network property above. In the property management table shown in FIG. 2(A), parameters displaying the degree to which security is ensured, the fee structure, and whether handover is possible are registered corresponding to network identifiers (hereinafter, "NW identifier") that uniquely identify each wireless communication network. Note that, in the present exemplary embodiment, the wireless communication networks 200a, 200b, and 200c have respectively been assigned "001", "002", and "003" as NW identifiers. Furthermore, the network addresses may also, of course, be used for assigning the NW identifiers above to each wireless communication network.

In FIG. 2(A), the parameter showing the degree to which security is ensured is "1" or "0". "1" indicates compatibility with encrypted communication, and "0" indicates incompatibility with encrypted communication. Similarly, in FIG. 2(A), the parameter that shows the fee structure is also "1" or "0". "1" indicates pay-as-you-go, and "0" indicates a flat-rate system. Furthermore, in FIG. 2(A), the parameter that indicates whether handover is possible is also "1" or "0". "1" indicates that handover is possible, and "0" indicates that handover is not possible.

Note that the possibility of encrypted communication, the fee structure, and the possibility of handover are always constant regardless of the time zone that the wireless communication network utilizes, so the property management table shown in FIG. 2(A) indicates properties irrelevant to time zones.

Figures 2B, 2C:
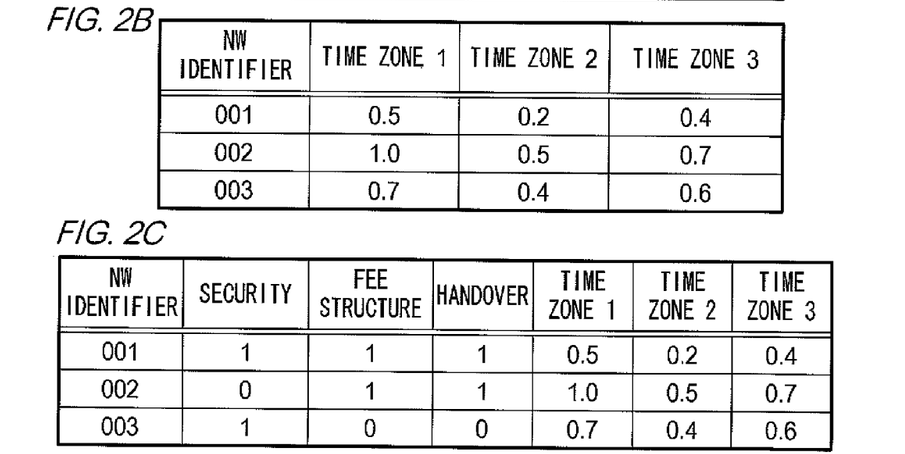

In contrast, in the property management table shown in FIG. 2(B), among the properties of each wireless communication network, parameters indicating properties that change according to time are stored corresponding to the NW identifiers above. Specifically, in the property management table shown in FIG. 2(B), the NW identifiers above are coordinated, and values indicating the communication speed (the data transfer speed in the present exemplary embodiment) of the wireless communication networks identified by the NW identifiers measured in three time zones,—12:00 midnight to 8:00 a.m. (FIG. 2(B): time zone 1), 8:00 a.m. to 4:00 p.m. (FIG. 2(B): time zone 2), 4:00 p.m. to 12:00 midnight the next day (FIG. 2(B): time zone 3),—are stored in Mbps units. Note that, in the present exemplary embodiment, data indicating the communication speed is described in the case of using the data transfer speed, but the response speed may also of course be used.

In the present exemplary embodiment, the two types of property management tables shown in FIGS. 2(A) and (B) are stored in the control device 300. Hereinafter, the property management table shown in FIG. 2(A) is referred to as the "first property management table", and the property management table shown in FIG. 2(B) is referred to as the "second property management table". Note that the present exemplary embodiment is described using a case in which each day is divided into three time zones and the data transfer speed of each wireless communication network in each time zone is stored in the second property management table, but each day may also of course be divided into two time zones of a.m. and p.m., for example, with the data transfer speed of each time zone being stored in the second property management table, and furthermore, each day may be divided into four or more time zones, with the data transfer speed in each time zone being stored in the second property management table. Moreover, the present exemplary embodiment is described using a case in which a property management table indicating wireless communication network properties independent of time zones and a property management table indicating properties dependent on time zones are separately stored in the control device 300, but of course an integrated property management table of both of these as shown in FIG. 2(C) may also be stored in the control device 300.

The control device 300 in FIG. 1 is connected to a wireless communication network 200a. The control device 300 has a function of responding to the storage content of the first management table above in response to a request from the communication terminal 100 as well as to the data transfer speed of each wireless communication network in the time zone corresponding to the time at which that request was received, and a function of receiving the data transfer speed, from the communication terminal 100, measured at the time at which the communication terminal 100 communicated data with the content server 600 and a function of renewing the storage content of the second property management table. Accordingly, a detailed description of the control device 300 has been omitted, because the control device 300 has a function identical to that of a general server device that performs data replies and data updates in response to requests from a communication terminal 100.

Figure 3:
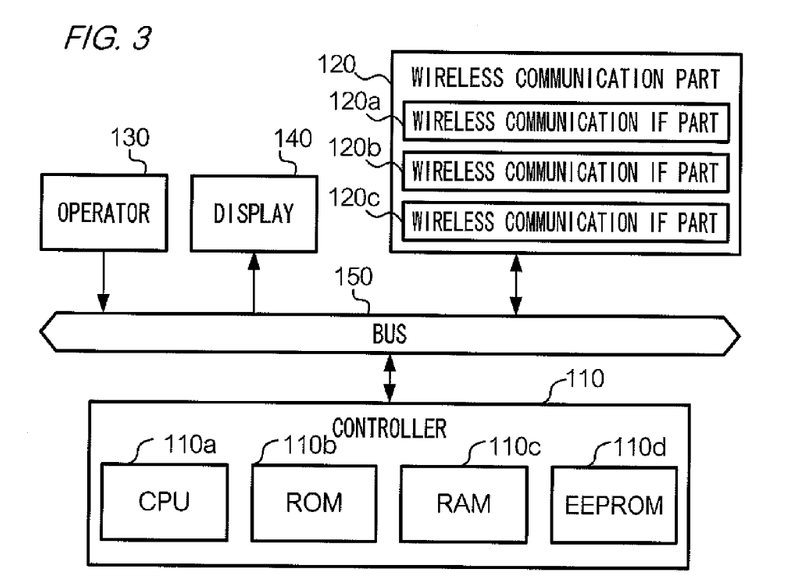
FIG. 3 shows an example of the hardware configuration of a communication terminal 100.

In addition to a configuration (e.g., a voice telephone call part) for providing a wireless telephone service via a mobile telephone network not shown in the drawing, as shown in FIG. 3, the communication terminal 100 is provided with a control unit 110, a wireless communication unit 120 (an example of communicating means), an operation unit 130, a display unit 140, and a bus 150 that mediates data exchange among these configuration elements.

As shown in FIG. 3, the control unit 110 includes a CPU (Central Processing Unit) 110a, ROM (Read Only Memory) 110b (an example of selecting means, establishing means, acquiring means, measuring means, and transmitting means), RAM (Random Access Memory) 110c, and EEPROM (Electronically Erasable and Programmable ROM) 110d.

The CPU 110a executes a program stored in the ROM 110b or EEPROM 110d with the RAM 110c as the work area and thereby controls the operation of each part of the communication terminal 100. Note that, in addition to storing the data and/or program to be described later, the EEPROM 110d functions also as a so-called address book, wherein telephone numbers, e-mail addresses, etc., are stored in list format. Furthermore, the communication address of the previously described control device 300 is also stored in the EEPROM 110d.

As shown in FIG. 3, the wireless communication unit 120 includes a first wireless communication interface (hereinafter, IF) part 120a, a second wireless communication IF unit 120b, and a third wireless communication IF unit 120c. The first wireless communication IF unit 120a establishes a wireless link with the BS 210a under the control of the control unit 110 and wirelessly exchanges data with this BS 210a. Similarly, the second wireless communication IF unit 120b establishes a wireless link with the BS 210b under the control of the control unit 110 and wirelessly exchanges data, and the third wireless communication IF unit 120c establishes a wireless link with the BS 210c under the control of the control unit 110 and wirelessly exchanges data.

The operation unit 130 is provided with an operator such as a button, and supplies an operation signal to the control unit 110 in response to an operation by the user. The display unit 140 includes a liquid crystal display and the drive circuit thereof and displays graphic images in response to graphic data supplied by the control unit 110.

A number of programs are stored beforehand in the ROM 110b. Hereinafter, these are referred to as "preinstalled programs". A multitask operating system (hereinafter referred to as "multitask OS"), the Java (registered trademark) platform, and native applications are included as examples of these preinstalled programs.

A multitask OS is an operating system that supports various functions, such as the allocation of virtual memory space necessary for the realization of multitask pseudo parallel execution via a TSS (Time-Sharing System).

A Java platform is a group of programs written according to the CDC (Connected Device Configuration), which is a configuration for realizing the Java execution environment 114 to be described later in mobile telephones with a built-in multitask OS.

A native application is a program that realizes the basic service of a communication terminal 100 such as browsing Web pages or exchanging e-mail, or is an application (e.g., a mailer 113 to be described later) or the like for receiving the provision of an e-mail exchange service or a so-called Web browser (e.g., a browser 112 to be described later).

The EEPROM 110d includes a Java application storage region in which Java applications are stored. A Java application includes a JAR (Java Archive) file in which graphic image files and/or sound clips are compiled to be utilized in conjunction with an program body in which the procedure of a process itself is described in addition to the execution of that program body in a Java execution environment, and also includes an ADF (Application Descriptor File) in which the installation and launching of the JAR file as well as various attributes are written. These Java applications are created by a CP, stored on a content server 600 or the like, and are arbitrarily downloaded via the use of the Web browser above.

Figure 4:
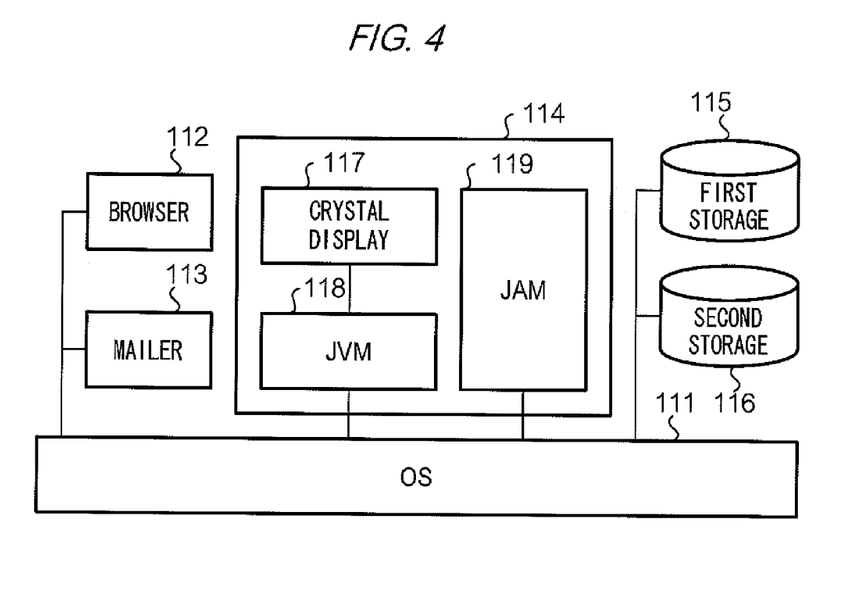
FIG. 4 shows an example of a software module realized by the CPU 110a of a communication terminal 100 executing various programs.

FIG. 4 is a drawing showing an example of a software module realized via the execution, by a CPU 110a, of various programs stored in the ROM 110b and EEPROM 110d. By the CPU 110a executing various programs in the communication terminal 100, the browser 112, mailer 113, and Java execution environment 114 are realized in the OS 111 as shown in FIG. 4, and furthermore, a first storage 115 and a second storage 116 are secured in the EEPROM 110d.

The Java execution environment 114 is realized via the Java platform in the ROM 110c. The Java execution environment 114 includes a class library 117, JVM (Java Virtual Machine) 118, and JAM (Java Application Manager) 119.

A class library 117 is the compilation of a group of program modules (classes) having specific functions into a single file. A communication control program that selects any one of the three wireless communication networks described above and establishes a communication connection between opposing devices is an example of a program module included in a class library 117.

The JVM 118 has a function of interpreting and executing byte code provided as a Java application and is optimized for the CDC mentioned above.

The JAM 119 has a function of managing the download and installation of Java applications as well as the launching and exiting of the same.

The first storage 115 is a region for storing Java applications (Jar files and ADF) downloaded under management by the JAM 119. The second storage 116 is a region for storing data created during the execution of a Java application after exiting the same, wherein individual storage regions are allocated for each installed Java application.

Furthermore, data in a storage region allocated by a certain Java application is rewritable only while the Java application is being executed, and it is designed so that other Java applications cannot write therein at that time.

Incidentally, in the first storage 115 of the communication terminal 100, a communication connection is established with the content server 600, and a Java application that communicates data is stored beforehand. The CPU 110a that executes this Java application in the Java execution environment 114 calls a previously mentioned communication control program, selects one from among any of the three wireless communication networks mentioned above, and establishes a communication connection, and in the event of that selection, the CPU 110a selects the wireless communication network that is most able to respond to both the demand of the CP, which is the provider of the Java application, as well as the demand (whether emphasis is placed on any item among each item that displays the communication network properties) of the user of the terminal itself.

Figure 5A:
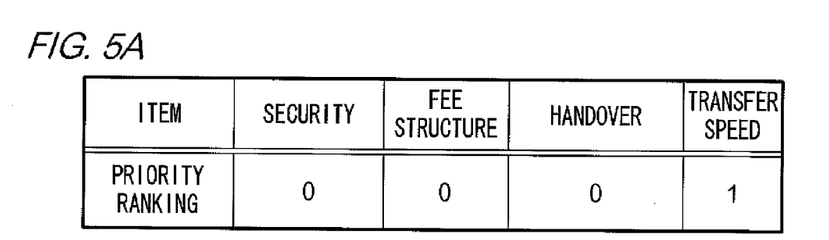
FIG. 5 shows an example of a priority ranking list stored in a communication terminal 100.

To explain this more specifically, the first priority ranking list (see FIG. 5(A)) indicating the user demand is stored in the EEPROM 110d of the communication terminal 100, and the second priority ranking list (see FIG. 5(B)) indicating the CP demand is stored in the ADF of the Java application described above. The second priority ranking list is determined by each of a variety of Java applications because the second priority ranking list is written in the ADF of various Java applications. In FIGS. 5(A) and (B), priority ranking "1" is written by the compiler of the priority ranking list (i.e., a user or CP) for the item with the highest priority, and priority ranking "0" is written for the other items. As is clear from referring to FIGS. 5(A) and (B), in the present exemplary embodiment, the user of the communication terminal 100 places priority on the data transfer speed, and the CP places priority on the degree to which security is ensured.

Before establishing a communication connection, the CPU 110*a* that is operating according to the communication control program above communicates with the control device 300, acquires storage content of the first and second property management tables, and then executes a process of selecting the wireless communication network in which the result of calculation is the largest, wherein a weighting (in the present exemplary embodiment, 10 in the case in which the priority ranking is "1", and "0" in the case in which the priority ranking is "0") for the item granted in response to a priority ranking registered in a first and a second priority ranking list are added to an appraised value of each item stored in these property management tables for each of the three wireless communication networks above. Thereby, the wireless communication network that may best respond to both the demand of the user of the terminal itself and the demand of the CP, which is the provider of the Java application, is selected.

Figure 5C:
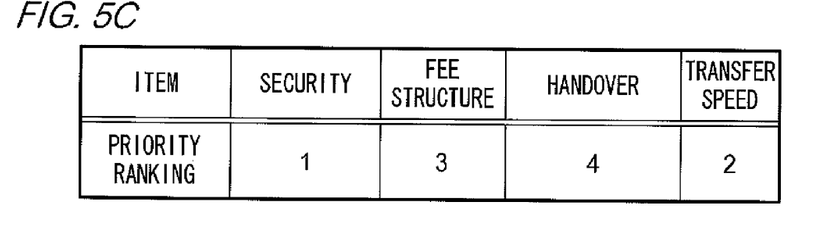
Figure 5D:
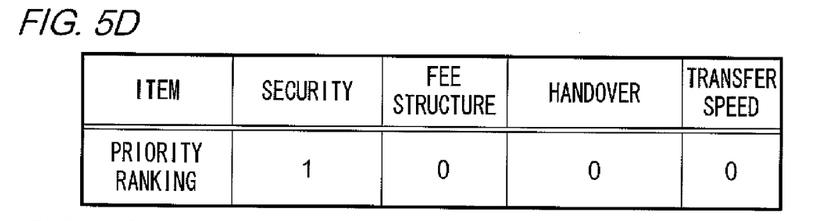

Note that, as shown in FIG. 5(A) and FIG. 5(B), the present exemplary embodiment is described in the case in which priority ranking "1" is written for the item in which the compiler of the priority ranking list (i.e., the user or CP) places the highest priority, and priority ranking "0" is written for the other items, but as shown in FIG. 5(C), the order of each item in which the compiler of the priority ranking list places the most importance is written as the priority ranking of those items, but of course the sum may be calculated by granting a weighting (as long as the corresponding relationship between the priority ranking and the weighting is determined appropriately, such as a weighting of 10 if the priority ranking is "1", a weighting of 8 if the priority ranking is "2", etc.) according to the priority ranking when the sum of the appraised values above is computed. Furthermore, the present exemplary embodiment is described in the case in which the second priority ranking list includes the ADF, but of course the second priority ranking list may also be included in the Jar.

This concludes the configuration of the communication terminal 100.

As described above, the hardware configuration of the communication terminal 100 is identical to the hardware configuration of a mobile telephone provided with a program execution function, and functions that are characteristic of communication terminals according to an aspect of the present invention are realized via software modules.

A-2: Operations

Next, operations characteristic of the communication terminal according to an aspect of the present invention among operations performed by the CPU 110*a* according to various programs in the communication terminal 100 will be described while referring to the drawings.

A user of a communication terminal 100 may specify the execution of a Java application via appropriate operation of an operation unit 130. Below, an example of the present operation is described using a case in which the execution of a Java application that communicates data with a content server 600 is specified.

When the execution of a Java application is specified as described above, the CPU 110*a* reads out the corresponding Java application from the EEPROM 110*d* according to the JAM 119 mentioned above, and commences the execution according to the JVM 118. As mentioned above, the Java application executed in the example of the present operation is a Java application that communicates data with a content server 600, and includes Java byte code for calling the communication control program mentioned above. The CPU 110*a* that operates according to the JVM 118 interprets and executes this Java byte code, calls a communication control program from the class library 117, and executes the same.

Figure 6:
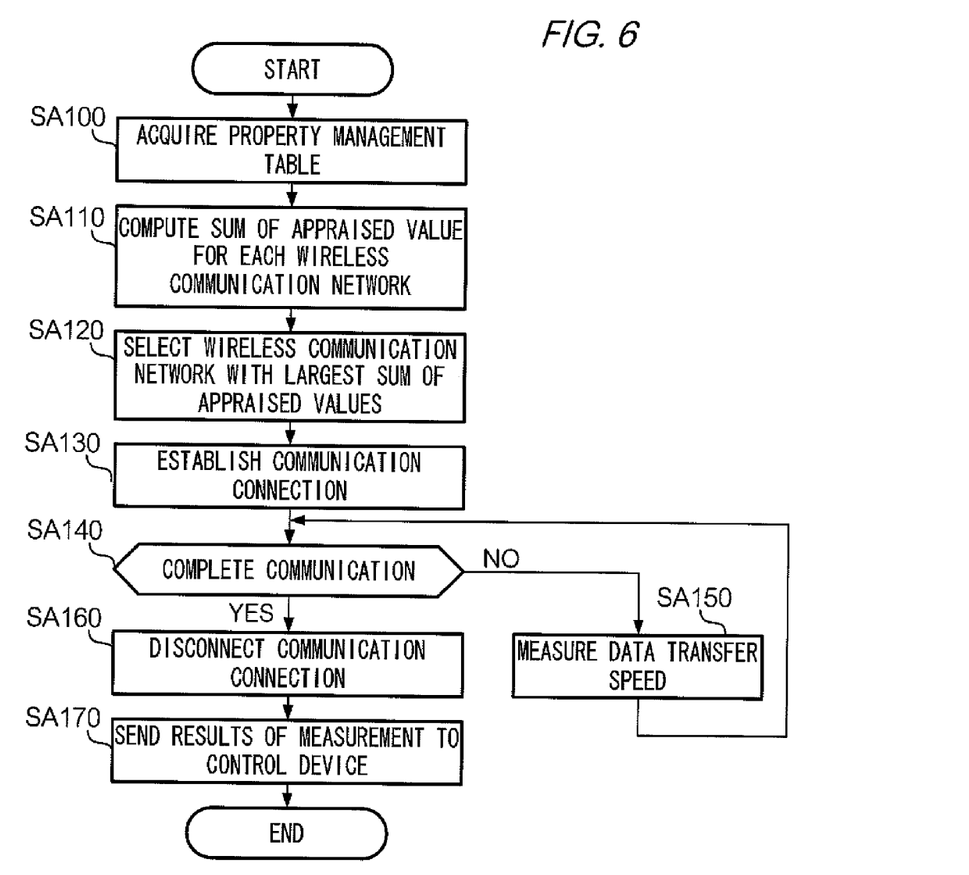

FIG. 6 is a flowchart showing the flow of an access point NW selection process executed by a CPU 110*a* that is operated according to a communication control program. As shown in FIG. 6, the CPU 110*a* first establishes a communication connection with the control device 300, and then acquires storage content of the first and the second property management tables (step SA100).

To explain this more specifically, the CPU 110*a* creates a communication message requesting the transmission of storage content of the first and second property management tables, and transmits this communication message addressed to the control device 300. In this way, the communication message transmitted from the communication terminal 100 is appropriately routed within the wireless communication network 200*a* and reaches the control device 300. If the control device 300 received this communication message, the control device 300 creates a communication message in which the storage content of the first property management table and the storage content of the second property management table corresponding to the time at which the communication message above was received (i.e., the data transfer speed for the time zone corresponding to the reception time) are written, and replies to the communication terminal 100. Thus, the communication message replied by the control device 300 is appropriately routed within the wireless communication network 200*a* and reaches the communication terminal 100. When the CPU 110*a* of the communication terminal 100 receives the communication message replied by the control device 300 via the first wireless communication IF unit 120*a*, the CPU 110*a* analyzes the communication message and obtains the storage content of the first and second property management tables.

Next, according to the storage content of the first and second property management tables obtained in step SA100 as well as the list content of the previously mentioned first and second priority ranking lists, the CPU 110*a* computes the sum of the appraised values of each item while granting the aforementioned weighting for each of the wireless communication networks 200*a*, 200*b*, and 200*c* (step SA110). The CPU 110*a* stores the computed sum in the RAM 110*c* corresponding to the NW identifier of the wireless communication network. At this time, the CPU 110*a* reads out the aforementioned second priority ranking list from the ADF of the Java application while attempting communication, and acts according to the content thereof.

In the example of the present operations, the content of the first and the second priority ranking lists is as in FIG. 5(A) and FIG. 5(B), and the storage content of the first and the second property management tables is as in FIG. 2(A) and FIG. 5(B), so in a case in which the time at which the execution of the Java application above is specified belongs to time zone 1, the sum of the appraised values for each of the wireless communication networks 200*a*, 200*b*, and 200*c* is computed as follows. Specifically, the sum of the appraised values computed for the wireless communication network 200*a* is 1.0×10 (security)+0.5×10 (transfer speed)=15, the sum of the appraised values computed for the wireless communication network 200*b* is 1.0×10 (transfer speed)=10, and the sum of the appraised values computed for the wireless communication network 200*c* is 1.0×10 (security)+0.7×10 (transfer speed)=17.

Next, the CPU 110*a* selects the largest sum of the appraised values computed in step SA110 from among the wireless communication networks 200a, 200b, and 200c as the access point NW (step SA120), and establishes a communication connection with the content server 600 via the wireless communication network identified by the NW identifier (step SA130). Note that, in a case in which multiple wireless communication networks in which the sums of the appraised values computed in step SA110 are all the largest, the NW identifiers thereof are displayed on the display unit 140, and an access point NW may be selected by the user from among these.

In the example of the present operations, the sum of the appraised values computed for the wireless communication network 200c is the largest, so the wireless communication network 200c is selected as the access point NW in step SA120, a wireless link is connected with the BS 210c in step SB130, and a communication connection is established. Thereafter, the CPU 110a communicates data with the content server 600 via the communication connection.

Meanwhile, in the process of executing the communication control program, the CPU 110a determines whether data communication has been completed according to the Java application above (step SA140). The CPU 110a measures the data transfer speed (step SA150) during the resulting determination is "No". Note that a well-known algorithm may be used for measurement of the data transfer speed.

Furthermore, when the resulting determination in step SA140 becomes "Yes", the CPU 110a disconnects (step SA160) the communication connection that was established in step SA130. The CPU 110a transmits (step SA170), to control device 300, data indicating the data transfer speed measured in step SA150 corresponding to the NW identifier selected in step SA120, and terminates the present access point selection process.

The aspect that should receive the most attention here is the aspect in which the wireless communication network 200c is selected as the access point NW in the example of the operation above, wherein the sum of the appraised values for the wireless communication network 200b was the largest (specifically, the communication network that corresponded the most to only the user demand was the wireless communication network 200b), and if the weighting based only on the second priority ranking list and the computed sum of the appraised values were performed, the sum of the appraised values of the wireless communication networks 200a and 200c were the largest (specifically, the communication network that most responded to the CP demand was either of the wireless communication networks 200a or 200c) when a weighting is granted based only on the first priority ranking list, and the sum of the appraised values is computed.

As is clear in referring to FIG. 2(A), the wireless communication network 200c is capable of encrypted communication, so this wireless communication network 200c meets the CP demand wherein priority is placed on ensuring security. Furthermore, as is clear in referring to FIG. 2(B), the data transfer speed of the wireless communication network 200c is faster than that of the wireless communication network 200a, so this wireless communication network 200c meets the user demand in which priority is placed on the data transfer speed.

Thus, as a result of the operations explained above, a communication connection is established with the content server 600 via a wireless communication network that meets the highest limits of both the CP demand (emphasis on security) and the user demand (emphasis on data transfer speed). Moreover, according to an aspect of the present exemplary embodiment, the user of the communication terminal 100 may create a first priority ranking list that reflects the user's own demand and store the first priority ranking list in the communication terminal 100. It is not necessary to perform the burdensome task of selecting the network that is most relevant to the user's own demand from among multiple wireless communication networks for each communication.

B: Second Exemplary Embodiment

Next, a second exemplary embodiment of the present invention is described while referring to the drawings.

B-1: Configuration

Figure 7:
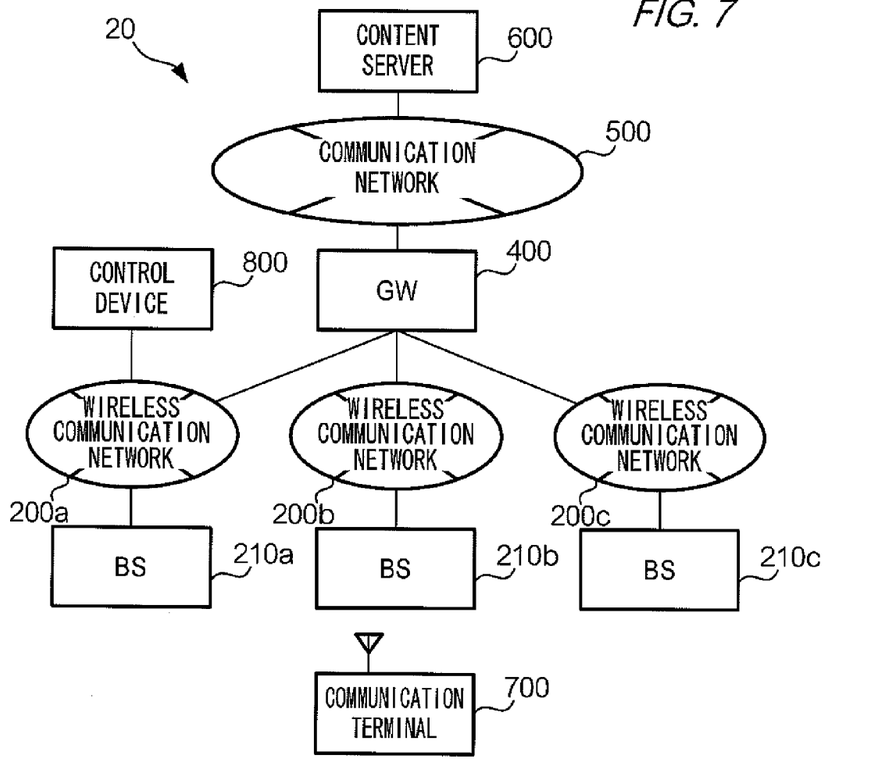
FIG. 7 is a drawing showing an example of the configuration of a communication system 20 relative to a second exemplary embodiment of the present invention.

FIG. 7 is a drawing showing an example configuration of a communication system 20 relative to the second exemplary embodiment of the present invention. Note that symbols that are the same as those in FIG. 1 have been affixed in FIG. 7 for configuration elements that are the same as those in the communication system 10 mentioned above. As is clear from contrasting FIG. 7 with FIG. 1, the aspects whereby communication system 20 differs from communication system 10 are the aspect wherein the communication system 10 includes a communication terminal 700 instead of the communication terminal 100 and the aspect wherein the communication system 10 includes a control device 800 instead of the control device 300.

Below is an explanation centering on the communication terminal 700 and the control device 800, which are the aspects that differ from the communication system 10.

The communication terminal 700 is a mobile telephone provided with a Java execution environment similarly to the communication terminal 100, and the hardware configuration thereof is identical to the hardware configuration of the communication terminal 100 (see FIG. 3). Furthermore, various software modules of a multitask OS, browser, mailer, and Java execution environment are realized by the CPU 110a of the communication terminal 700 executing various programs stored in the ROM 110b or EEPROM 110d (see FIG. 4), and reserving of the first and the second storage in the EEPROM 110d (see FIG. 4) is identical to that of the communication terminal 100 described above.

However, with regard to the communication control program that executes the access point NW selection process within the Java execution environment of the communication terminal 700, because one that is different than that in the communication terminal 100 is registered in the class library, an access point NW selection process that is different from the access point NW selection process (see FIG. 6) in the first exemplary embodiment described above is executed.

Next, the control device 800 is described.

Figure 8:
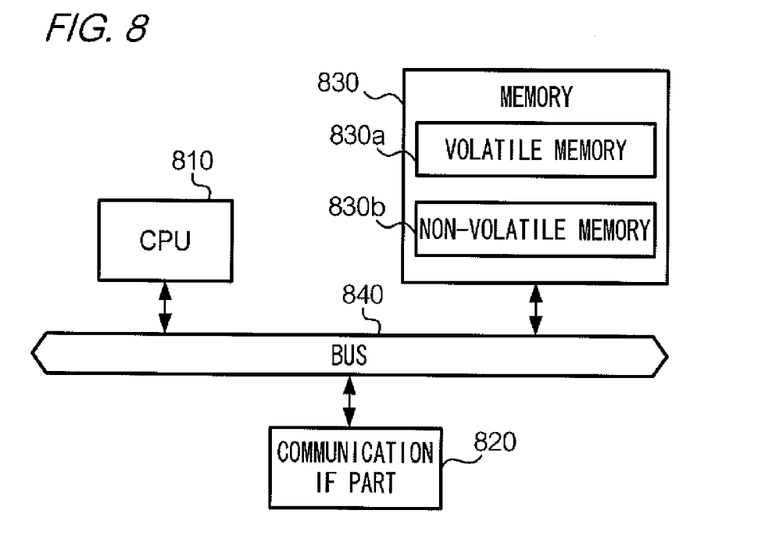
FIG. 8 shows an example of the hardware configuration of a control device 800.

FIG. 8 shows an example hardware configuration of the control device 800.

The control device 800 as shown in FIG. 8 includes a CPU 810 (an example of selecting means and notifying means), a communication IF unit 820, a memory 830, and a bus 840 that mediates data exchange among these configuration elements.

The CPU 810 controls the operation of each part according to various programs stored in the memory 830.

The communication IF unit 820 may be an NIC (Network Interface Card), for example, and is connected via a cable to the wireless communication network 200a. While receiving data that has been transmitted from the wireless communication network 200a and transferring the data to the CPU 810, this communication IF unit 820 sends data transferred from the CPU 810 to the wireless communication network 200a.

As shown in FIG. 8, the memory 830 includes a volatile memory 830a and a non-volatile memory 830b. The volatile memory 830a may be a RAM, for example, and is utilized as a work area while the CPU 810 executes various programs. On the other hand, the non-volatile memory 830b may be a hard disk, for example, and stores various data and various programs. The above-mentioned first and second property management tables (see FIG. 2) are examples of data stored in this non-volatile memory 830b, and the access point notification program in which the OS program for realizing the above-mentioned OS is executed by the CPU 810, and the access point NW notification process that is characteristic of the control device relative to the present invention is executed by the CPU 810 are examples of programs stored in this non-volatile memory 830b.

In the present exemplary embodiment, when the power (omitted from the drawing) of the control device 800 is turned on, the CPU 810 first loads the OS program from the non-volatile memory 830b into the volatile memory 830a, and commences the execution thereof. Furthermore, the CPU 810, which has switched to a state in which execution of the OS program has been completed and the OS is realized, loads the access point notification program from the non-volatile memory 830b into the volatile memory 830a and commences the execution thereof. The operation performed by the CPU 810 of operating according to this access point notification program is described in detail below.

As described above, the hardware configuration of the control device 800 does not change in any way from the hardware configuration of a general computer device, and the functions that are characteristic of the control device relative to the present invention are all realized as software modules.

This concludes the configuration of the control device 800 above.

B-2: Operations

Next, operations that significantly show the characteristics of the operations performed by the communication terminal 700 and the control device 800 will be described while referring to the drawings.

Figure 9:
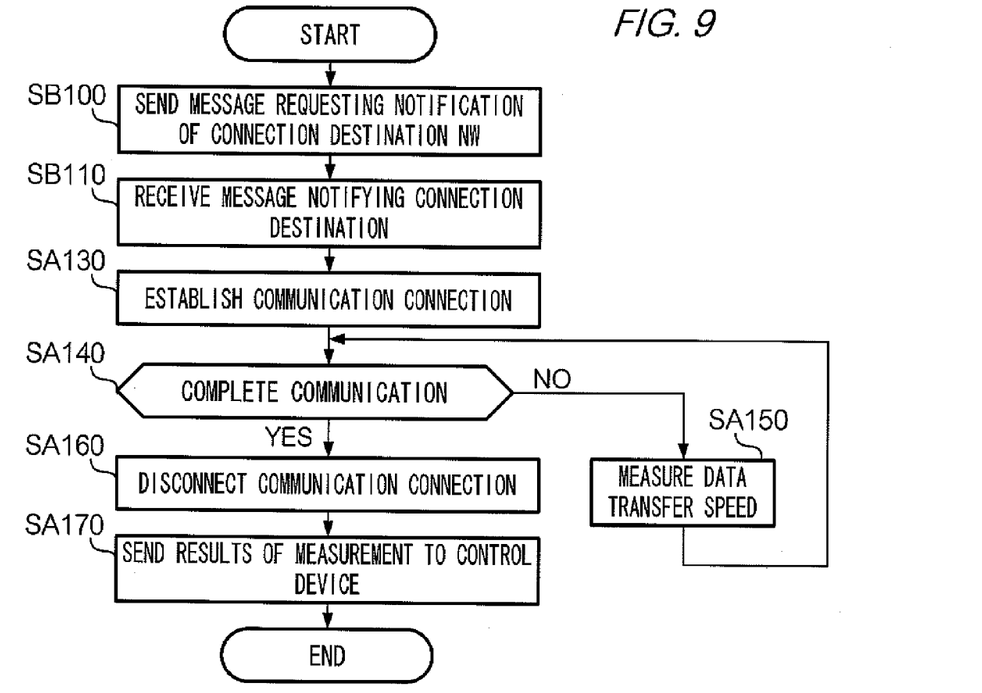
FIG. 9 is a flowchart showing an access point NW selection process executed by the CPU 110a of a communication terminal 700.

FIG. 9 is a flowchart showing the flow of an access point NW selection process that the CPU 110a of the communication terminal 700 performs according to the communication control program. As is clear from contrasting FIG. 9 with FIG. 6, the aspect whereby the access point NW selection process shown in FIG. 9 differs from the access point NW selection process shown in FIG. 6 is the aspect wherein the process shown in FIG. 9 has step SB100 and step SB110 instead of step SA100 to step SA120.

In step SB 100 of FIG. 9, the CPU 110a reads out the first and the second priority ranking lists stored in the EEPROM 110d, creates a communication message (hereinafter, "access point notification request message") in which these first and second priority ranking lists are written. The CPU 110a transmits the access point notification request message addressed to the control device 800.

The access point notification request message transmitted from the communication terminal 700 in this way is appropriately routed by the network equipment (omitted from FIG. 7) within the wireless communication network 200a and reaches the control device 800, which is the destination thereof.

Figure 10:
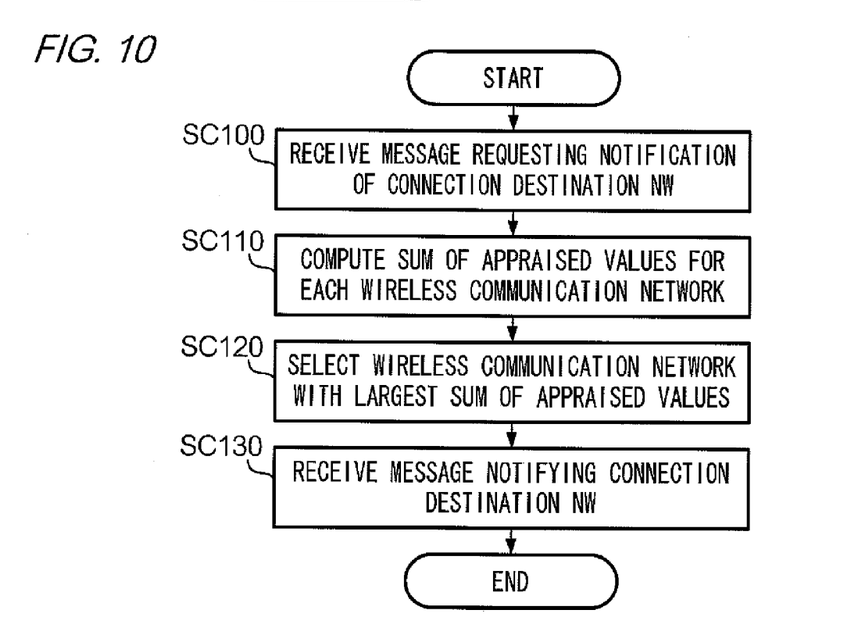
FIG. 10 is a flowchart showing the flow of an access point notification process executed by a CPU 810 according to an access point notification program.

FIG. 10 is a flowchart showing the flow of the access point NW notification process that the CPU 810 of the control device 800 performs according to the communication management program above. As shown in FIG. 10, when the CPU 810 receives (step SC100) the access point notification request message above via the communication IF unit 820, the CPU 810 computes the appraised values of each of the wireless communication networks 200a, 200b, and 200c according to the first and the second priority ranking lists that are not in the access point notification request message as well as the storage content of the first and the second property management tables stored in the non-volatile memory 830b. Note that the detailed description of the process that the CPU 810 performs in this step SC110 has been omitted, because it is identical to the process that the CPU 110a of the communication terminal 100 performs in step SA110 of the flowchart shown in FIG. 6.

Next, the CPU 810 selects the wireless communication network with the largest appraised value computed in step SC110 as the wireless communication network to which the communication terminal 700 should connect (step SC120), and creates a communication message (hereinafter, "access point notification message") in which the NW identifier of the wireless communication network is written. The CPU 810 notifies the results of this selection. Specifically, in other words, the access point notification message is replied to, addressed to the source of the access point notification request message above (step SC130).

An access point notification message transmitted from the control device 800 in this way is appropriately routed by the network equipment within the wireless communication network 200a and reaches the communication terminal 700.

Returning to FIG. 9, when the CPU 110a of the communication terminal 700 receives the access point notification message above via the wireless communication unit 120 (step SB110), the CPU 110a reads out the NW identifier written in the message and executes the process following step SA130 mentioned above.

As a result of the operations performed as explained above, similarly to that in the first exemplary embodiment mentioned above, a communication connection is established between the communication terminal 700 and the content server 600 via the wireless communication network 200c and the communication network 500, and data communication is commenced between the communication terminal 700 and the content server 600.

Note that while data is being communicated with the content server 600 via the wireless communication network and the communication network 500 identified by the NW identifier above, the aspect of notifying the control device 800 of the results of the measurement is the same as in the first exemplary embodiment described above at the time in which the data transfer speed thereof is measured and the data communication is completed. Meanwhile, in a case in which the data transfer speed data and NW identifier that have been transmitted from the communication terminal 700 are received, the aspect whereby the storage content of the second property management table is updated by the data transfer speed data is also the same as in the first exemplary embodiment described above.

Thus, the effect obtained by the present second exemplary embodiment is identical to that of the first exemplary embodiment described above.

C: Modifications

Above, exemplary embodiments for implementing the present invention are described. However, modifications such as those mentioned below may also of course be applied. Two or more examples of the modification described below may also be combined and used.

The first and the second exemplary embodiments described above are described using a case in which the communication terminal 100 and the communication terminal 700 have a Java execution environment based on a CDC as the program execution environment, but they may also have a Java execution environment based on a CLDC, and a case in which they have a program execution environment other than a Java execution environment is also of course possible. Note that programs created and compiled in programming languages other than C++ are examples of the application program executed by a program execution environment other than a Java execution environment.

The first and the second exemplary embodiments described above are described using a case in which they have program execution environments, and furthermore, provide the present invention in a mobile telephone capable of accommodating multiple types of wireless communication networks. However, a suitable application for the present invention is not limited to the mobile telephone above, and may include a PDA or notebook personal computer that has a program execution environment and is furthermore capable of accommodating multiple types of wireless communication networks, and moreover, may include a desktop personal computer that has a program execution environment and is furthermore capable of a wired connection to any of multiple types of communication networks. The point is that the present invention may be applied as long as it has a program execution environment, and furthermore that it is a communication terminal capable of establishing a communication connection with an opposing device via any of multiple types of communication networks and of communicating data.

The first and the second exemplary embodiments described above are described using a case in which measurement of the data transfer speed and notification to the control device are executed by the communication terminal, but these may also of course be executed by the content server, which is the other party of the communication.

Furthermore, the first and the second exemplary embodiments described above are shown as examples of the wireless communication networks 200a, 200b, 200c, which each have base stations as the communication networks for the communication terminal 100 to perform communication, but they are not limited to these and may operate without base stations. In short, the present invention may be applied to any application as long as a communication terminal establishes a communication connection with an opposing device and it constitutes communication media that is capable of communication. Therefore, communication and the like that uses wireless communication or infrared according to specifications such as Bluetooth (registered trademark), for example, is also included within the concept of this "communication media".

In comparing wireless communication according to specifications such as Bluetooth (registered trademark), for example, with wireless communication using the wireless communication networks 200a, 200b, 200c, the transfer speed is fast, and furthermore, the security is set to low while the communication fee is free of charge. Furthermore, a case is presupposed in which the users emphasize the communication fees in the first priority ranking list and the CP emphasize the transfer speed in the second priority ranking list. In this case, wireless communication according to the Bluetooth (registered trademark) specification corresponds to both user and CP demands, and the communication terminal is therefore configured to select wireless communication according to this Bluetooth (registered trademark) specification as the communication media that should be utilized.

Moreover, the first and the second exemplary embodiments are described using a case in which the degree to which security is ensured, the fee structure, whether handover is possible, and data transfer speed are used as items indicating the wireless communication network properties, but of course other items such as the frequency of occurrence of communication errors may also be added, and conversely, any of the degree to which security is ensured, the fee structure, whether handover is possible, and/or data transfer speed may also be excluded. The aspect is that the appraised value of each communication network for the different multiple items is registered in the property management table, and a priority ranking list showing which of these multiple items has priority should be created by the user and CP of the communication terminal. Note that, in a case in which data transfer speed is excluded from the evaluation items, it is obviously unnecessary for the measurement of the data transfer speed and the notification to the control device to be performed by the communication terminal or content server.

The first and the second exemplary embodiments described above are described using a case in which the communication network that should mediate the data communication is selected and a communication connection is established before the commencement of data communication by the application, and the communication connection is maintained (not disconnected) until the data communication is completed. However, communication by an application is generally divided into multiple types of stages, such as an authentication stage in which the authentication of an opposing device that is the other party of the communication, for example, and a data-exchange stage in which the data necessary for the execution of the application is actually exchanged, and it is also common for the network properties emphasized in each of these stages to differ. Therein, the above-mentioned first and second priority ranking lists are prepared beforehand for each stage, and the access point NW may also of course be selected for each stage.

The first and the second exemplary embodiments are described using a case in which a heavy weighting is granted to values with a high priority ranking according to the first and the second priority ranking lists, the sum of the appraised values is computed, and the largest sum thereof is selected as the access point network. However, a smaller weighting may also be granted to values to the extent that the priority ranking is higher, the sum of the appraised values is computed, and the smallest sum thereof may of course be selected as the access point network.

Furthermore, in a case in which a communication network that should be excluded by a user or the CP as a connection target is specified beforehand, and the communication network with the largest sum of appraised values is excluded from this as a suitable communication network, the one in which the sum of the appraised values above is the largest may be selected from among the communication networks that are excluded, and moreover, the weighting may be granted according to the third priority ranking list in addition to the first and the second priority ranking lists above, and the sum of the appraised values above may be computed. The point is that a communication network should be selected in response to the sum of the appraised values with a weighting granted according to the first and the second priority ranking lists (in other words, a communication network is selected with consideration of both the user demand and the CP demand).

The first exemplary embodiment described above is described using a case wherein a communication control program in which a CPU executes an access point NW selection process that is characteristic of communication terminals relative to the present invention is stored beforehand in the ROM 110b of the communication terminal 100. However, the communication control program above may be written in computer-readable recording media (e.g., CD-ROM (Compact Disk-Read Only Memory) or DVD (Digital Versatile Disk), etc.) and be distributed, and furthermore, the communication control program above may be distributed by being downloaded via electrical communication lines such as the Internet.

Furthermore, the second exemplary embodiment described above is described using a case in which a communication control program in which a CPU executes an access point NW selection process that is characteristic of a control device relative to the present invention is stored beforehand in the non-volatile memory 830b of the control device 800, but the relevant communication control program may also be distributed by being written in computer-readable recording media and may be distributed by being downloaded via electrical communication lines.

The configuration of the hardware of the communication terminal and control device is not limited to those described in the exemplary embodiments. These devices may have any hardware configuration as long as they realize the necessary functional configuration. For example, in the exemplary embodiments described above, the CPU 110a of the communication terminal 100 has multiple functions—specifically, the functions of selecting means, establishing means, acquiring means, measuring means, and transmitting means. However, at least some of these functions may be realized by hardware elements other than the CPU 110a.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular program or device to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A communication terminal comprising:
a property management table in which an appraised value of each of a plurality of types of communication media is registered for each of a plurality of predetermined items that shows communication media properties;
a first priority ranking list in which a priority ranking assigned by users for each of the plurality of predetermined items is registered;
a second priority ranking list in which a priority ranking assigned by a provider of an application program for each of the plurality of predetermined items is registered;
selecting means for selecting a preferred communication medium from among the plurality of types of communication media in response to the results of an addition operation, wherein in the event that a commencement of communication is specified according to a predetermined application program, for each of the plurality of types of communication media, a first weighting granted for each of said plurality of predetermined items in response to a priority ranking registered in the first priority ranking list and a second weighting granted for each of said plurality of predetermined items in response to a priority ranking registered in the second priority ranking list are added to an appraised value of the each item registered in the property management table;
establishing means for establishing a plurality of communication connections between opposing devices by means of said plurality of communication media selected by the selecting means; and
communicating means for communicating by the plurality of communication connections according to the application program.

2. The communication terminal according to claim 1, further comprising
acquiring means for acquiring the property management table from a predetermined control device.

3. The communication terminal according to claim 2 wherein:
the plurality of predetermined items includes at least a communication speed: and
the communication terminal further comprises:
measuring means for measuring the communication speed when communication is performed according to the application program by means of a communication connection established by the establishing means; and
transmitting means for transmitting, to the control device, data showing the communication speed measured by a measuring means as triggered by a completion of communication according to the application program by associating with an identifier that uniquely identifies communication media selected by the selecting means.

4. A control device, comprising:
a property management table in which an appraised value of each of a plurality of types of communication media is registered for each of a plurality of predetermined items showing communication media properties;
a first priority ranking list in which a priority ranking for each of the plurality of predetermined items assigned by communication terminal users is registered;
a second priority ranking list in which a priority ranking for each of the plurality of predetermined items assigned by an application program provider is registered;
selecting means for selecting, from among the plurality of types of communication media, a preferred communication medium for which the communication should be mediated in response to the results of an addition operation, in which a first weighting granted for each of said plurality of predetermined items in response to a priority ranking registered in the first priority ranking list and a second weighting granted for each of said plurality of predetermined items in response to a priority ranking registered in the second priority ranking list are added to an appraised value of the each item registered in the property management table for each of the plurality of types of communication media in the event that the communication terminal communicates with an opposing device according to the application program; and
notifying means for notifying the communication terminal of the results of a selection by the selecting means.

5. A communication system including a control device by which a communication terminal communicates with a second communication terminal by means of a communication connection according to a predetermined application program, the communication terminal establishing a connection with an opposing device, wherein:
the control device comprises:
a property management table in which an appraised value of each of a plurality of types of communication media is registered for each of a predetermined plurality of predetermined items showing communication media properties; and
transmitting means for transmitting said property management table to the communication terminal in response to a request from the communication terminal, and
the communication terminal comprises:
a first priority ranking list in which a priority ranking assigned by users for each of the plurality of predetermined items is registered;

a second priority ranking list in which a priority ranking assigned by a provider of the application program for each of the plurality of predetermined items is registered;

selecting means for selecting a preferred communication medium from among the plurality of types of communication media in response to the results of an addition operation, in which a first weighting granted for each of said plurality of predetermined items in response to a priority ranking registered in the second priority ranking list and a second weighting granted for each of said plurality of predetermined items in response to a priority ranking registered in the second priority ranking list are added to an appraised value of the each item registered in the property management table for each of the plurality of types of communication media when a commencement of communication is specified by the application program; and establishing means for establishing a communication connection between the opposing devices by means of said communication media selected by the selecting means.

6. A communication system including a control device by which a communication terminal communicates with a second communication terminal by means of a plurality of communication connections according to a predetermined application program, the communication terminal establishing a connection with an opposing device, wherein:

the control device includes a property management table in which an appraised value of each of a plurality of types of communication media is registered for each of a plurality of predetermined items showing communication media properties;

the communication terminal includes a first priority ranking list in which a priority ranking assigned by communication terminal users for each of the plurality of predetermined items is registered;

the communication terminal further includes a second priority ranking list in which a priority ranking assigned by a provider of the application program for each of the plurality of predetermined items is registered;

the communication terminal further includes establishing means for establishing said communication connections between the opposing devices by means of said plurality of types of communication media that is notified by the control device as an access point communication media while the first and second priority ranking lists are transmitted to the control device when a commencement of communication is specified according to the application program, the control device has selecting means for selecting, from among the plurality of types of communication media, the preferred communication medium for which the communication should be mediated in response to the results of an addition operation, in which a first weighting granted in response to a priority ranking registered in a first priority ranking list received from the communication terminal and a second weighting granted in response to a priority ranking registered in a second priority ranking list received from the communication terminal are added to an appraised value of the each item registered in the property management table for each of the plurality of types of communication media when the communication terminal communicates with an opposing device according to the application program; and the control device has a notifying means for notifying the communication terminal of results of a selection by the selecting means.

7. A non-transitory program causing a computer device to execute a process, the computer device including a property management table in which an appraised value is registered for each of a plurality of predetermined items showing communication media properties for each of a plurality of types of communication media, a first priority ranking list in which a priority ranking assigned by users for each of the plurality of predetermined items is registered, and a second priority ranking list in which a priority ranking assigned by a provider of the application program for each of the plurality of predetermined items is registered, the process comprising:

selecting a preferred communication medium from among the plurality of types of communication media in response to the results of an addition operation, in which a first weighting granted for each of said plurality of predetermined items in response to a priority ranking registered in the first priority ranking list and a second weighting granted for each of said plurality of predetermined items in response to a priority ranking registered in the second priority ranking list are added to an appraised value of the each item registered in the property management table for each of the plurality of types of communication media when a commencement of communication is specified according to a predetermined application program;

establishing a communication connection between opposing devices by means of the selected communication media; and communicating by means of said communication connection according to the application program.

8. A non-transitory program causing a computer device to execute a process, the computer device including a property management table in which an appraised value of each of a plurality of types of communication media is registered for each of a plurality of predetermined items showing communication media properties, a first priority ranking list in which a priority ranking assigned by communication terminal users is registered for each of the plurality of predetermined items, and a second priority ranking list in which a priority ranking assigned by a provider of an application program for each of the plurality of predetermined items is registered, the process comprising:

selecting, from among the plurality of types of communication media, a preferred communication medium for which the communication should be mediated in response to the results of an addition operation, in which a first weighting granted for each of said plurality of predetermined items in response to a priority ranking registered in the first priority ranking list and a second weighting granted for each of said plurality of predetermined items in response to a priority ranking registered in the second priority ranking list are added to an appraised value of the each item registered in the property management table for each of the plurality of types of communication media when the communication terminal communicates with an opposing device according to the application program; and notifying the communication terminal of the results of a selection.

* * * * *